United States Patent
Schübeler et al.

(10) Patent No.: US 12,442,378 B2
(45) Date of Patent: Oct. 14, 2025

(54) IMPELLER AND METHOD FOR OPERATING AN IMPELLER

(71) Applicant: mdGroup Germany GmbH, Siegen (DE)

(72) Inventors: Daniel Schübeler, Siegen (DE); Sven Meerkötter, Siegen (DE)

(73) Assignee: MDGROUP Germany GmbH, Siegen (DE)

( * ) Notice: Subject to any disclaimer, the term of this patent is extended or adjusted under 35 U.S.C. 154(b) by 134 days.

(21) Appl. No.: 18/549,686

(22) PCT Filed: Mar. 3, 2022

(86) PCT No.: PCT/EP2022/055395
§ 371 (c)(1),
(2) Date: Sep. 8, 2023

(87) PCT Pub. No.: WO2022/189251
PCT Pub. Date: Sep. 15, 2022

(65) Prior Publication Data
US 2024/0151233 A1  May 9, 2024

(30) Foreign Application Priority Data
Mar. 9, 2021   (EP) ..................... 21161532

(51) Int. Cl.
*F04D 19/00* (2006.01)
*F04D 25/06* (2006.01)
(Continued)

(52) U.S. Cl.
CPC ........... *F04D 19/002* (2013.01); *F04D 25/06* (2013.01); *F04D 25/08* (2013.01); *F04D 29/056* (2013.01); *F04D 29/06* (2013.01); *F04D 29/5806* (2013.01)

(58) Field of Classification Search
CPC .. H02K 9/10; H02K 9/14; F04D 19/00; F04D 19/02; F04D 25/06; F04D 25/082; F04D 29/584; F04D 29/5806
See application file for complete search history.

(56) References Cited

U.S. PATENT DOCUMENTS

| 3,199,774 A * | 8/1965 | Lowell ................ F04D 29/5806 310/63 |
| 2012/0011878 A1* | 1/2012 | Hipsky ................. F04D 29/584 62/401 |
| 2022/0255411 A1* | 8/2022 | Yazaki ..................... H02K 9/10 |

FOREIGN PATENT DOCUMENTS

| DE | 377132 C | 6/1923 |
| FR | 2910078 A1 | 6/2008 |

OTHER PUBLICATIONS

PCT International Search Report and Written Opinion for International Application No. PCT/EP2022/055395 filed Mar. 3, 2022; Date of Mailing: May 18, 2022; 12 pgs.
(Continued)

*Primary Examiner* — Kenneth J Hansen
(74) *Attorney, Agent, or Firm* — Alix, Yale & Ristas, LLP

(57) ABSTRACT

A method for operating an impeller, in the case of which method the impeller comprises an impeller housing (15) and a motor housing (19) which is arranged in the impeller housing. A motor (16) is arranged in an interior space (36, 38) of the motor housing (19), wherein an impeller rotor (14) is driven by way of the motor (16), in order to generate an air stream along an annular chamber (31) which is enclosed between the impeller housing (15) and the motor housing (19). A positive pressure is applied in the interior space (36, 38) of the motor housing (19), with the result that a leakage flow which is directed to the outside from the interior space (36, 38) of the motor housing (19) is produced through a
(Continued)

sealing gap (37) which is arranged between the motor shaft (17) and the motor housing (19). The invention also relates to an associated impeller.

12 Claims, 6 Drawing Sheets

(51) Int. Cl.
  *F04D 25/08*  (2006.01)
  *F04D 29/056*  (2006.01)
  *F04D 29/06*  (2006.01)
  *F04D 29/58*  (2006.01)

(56) References Cited

OTHER PUBLICATIONS

English translation of the PCT International Preliminary Report on Patentability for International Application No. PCT/EP2022/055395 filed on Mar. 3, 2022, Date of Mailing: Sep. 12, 2023; 7 pgs.

\* cited by examiner

IMPELLER AND METHOD FOR OPERATING AN IMPELLER

BACKGROUND

The invention relates to a method for operating an impeller. The impeller comprises an impeller housing and a motor housing arranged in the impeller housing. A motor arranged in the motor housing is used to drive an impeller rotor in order to generate an air stream along an annular space formed between the impeller housing and the motor housing. The invention moreover relates to an impeller suitable for carrying out the method.

The impeller rotor is connected to the motor via a motor shaft. Since the motor shaft extends outward from the interior space of the motor housing, the interior space of the motor housing cannot be hermetically separated from the surroundings. If the impeller is operated under adverse environmental conditions, there is the risk that impurities such as dust or liquids can enter the interior space of the motor housing through a gap between the motor shaft and the motor housing.

If the gap between the motor housing and the motor shaft is sealed by a shaft sealing ring which is in sliding contact, the friction increases. Moreover, shaft sealing rings generally have a reliable action only up to a rotational speed of approximately 25 000 rpm. Impellers can, however, be operated at higher rotational speeds of, for example, 40 000 rpm.

SUMMARY

The invention is based on the object of presenting an impeller and a method for operating an impeller which alleviate the risk of impurities entering the interior space of the motor housing during operation of the impeller. Proceeding from the cited prior art, the object is achieved by the features of the independent claims. Advantageous embodiments are specified in the dependent claims.

In the course of the method according to the invention, an excess pressure is applied in the interior space of the motor housing, with the result that a leakage flow directed from the interior space of the motor housing outward is generated through a sealing gap arranged between the motor shaft and the motor housing.

The leakage flow, directed from inside to outside, in the sealing gap counteracts the entry of impurities into the interior space of the motor housing. The impeller can be operated under adverse environmental conditions without the motor being adversely affected by impurities in the interior space of the motor housing.

The motor shaft can be mounted so as to be able to rotate with respect to the motor housing via one or more bearings. One of the bearings (main bearing) may be arranged between the motor and the impeller rotor driven by the motor shaft, relative to the axial direction. The motor may be an electric motor. The main bearing may be arranged between the magnetic components of the electric motor and the impeller rotor. The sealing gap may be arranged between the main bearing and the impeller rotor.

The method may be carried out such that the sealing gap is arranged between the outer shell of the main bearing and the inner shell of the main bearing, with the result that the leakage flow extends through the main bearing. This approach has the disadvantage that the lubrication of the main bearing can be adversely affected if lubricant is also removed from the main bearing with the leakage flow.

In a preferred embodiment, the sealing gap is arranged in an axial position between the main bearing and the impeller rotor. The sealing gap may have a contactless design, so that there is no contact between the motor shaft and the motor housing across the sealing gap. The cross section of the sealing gap should be as small as manufacturing technology allows. If the sealing gap is an annular gap between a circular circumference of the motor shaft and a circular recess in the motor housing, the recess is preferably concentric in relation to the motor shaft. In that case, the cross-sectional area of the sealing gap depends on the radial distance between the motor shaft and the motor housing. The greatest distance between the motor shaft and the motor housing across the sealing gap is preferably less than 100 µm, preferably less than 50 µm, and more preferably less than 20 µm.

The excess pressure in the motor housing can be applied by introducing a gaseous medium into the interior space of the motor housing. An outlet opening, from which the gaseous medium exits, may be formed in the interior space of the motor housing.

The outlet opening may lead into a front cavity arranged between the main bearing and the sealing gap. From the front cavity, the leakage flow can go directly to the sealing gap without diversion and exit the interior space of the motor housing there.

The front cavity may extend over the circumference of the motor shaft. The front cavity may be arranged in an axial position between the impeller rotor and the main bearing, in particular in an axial position between the sealing gap and the main bearing. If the sealing gap has a greater extent in an axial direction, there may also be an axial overlap between the front cavity and the sealing gap.

The method may be carried out such that the excess pressure is applied in the first instance in the front cavity and such that the rest of the interior space (main space) of the motor housing is separate from the front cavity. In that case, no significant gas stream from the front cavity to the main space is generated.

It is also possible for there to be a compensation channel between the front cavity and the main space of the motor housing, with the result that pressure can be compensated between the front cavity and the main space. The compensation channel may extend through the main bearing, although this can have the disadvantage of removing lubricant from the main bearing.

In one embodiment, the compensation channel bypasses the main bearing. The main bearing may have a cover, with the result that the flow resistance is increased through the main bearing.

The outer shell of the main bearing may be received in a bearing receptacle of the motor housing. The bearing receptacle may have a receiving surface against which a circumferential surface of the main bearing bears. A recess may be formed in the receiving surface, with the result that a portion of the compensation channel is formed between the recess and the circumferential surface.

The impeller may comprise a plurality of compensation channels between the front cavity and the main space. The plurality of compensation channels may be distributed over the circumference of the main bearing, in particular evenly distributed over the circumference of the main bearing. For example, the impeller may comprise at least two, preferably at least three, more preferably at least four compensation channels.

The outlet opening for the gaseous medium may also lead into the main space of the motor housing if the motor housing is designed to ensure a sufficient flow of the gaseous medium from the outlet opening to the sealing gap.

If the main space of the motor housing is also placed under excess pressure, this has the advantage that there is protection against impurities entering even when the motor housing has other leakages apart from the sealing gap. The motor housing may be designed such that it does not have any other leakages in the regular state. The motor housing may thus be sealed all around between the motor shaft and the motor housing apart from the sealing gap. In particular, all the housing joints between two housing parts of the motor housing can be sealed by means of a seal lying in between. Leakages can be produced when the motor housing takes damage or a seal is faulty. If another passage channel is produced between the interior space of the housing and the exterior space in this way, it is also protected against the entry of impurities by the excess pressure in the interior space of the motor housing.

The impeller may comprise a reservoir of a gaseous medium, from which the gas stream for generating the excess pressure is supplied. The reservoir may be under excess pressure, so that the gas stream can be impelled by the excess pressure. The impeller may comprise a valve, in order to release or block the gas stream. For example, the reservoir under excess pressure may be a gas-filled pressure cartridge. The reservoir may be arranged inside the motor housing. It is also possible for the reservoir to be arranged outside the impeller housing and optionally spaced apart from the impeller housing and that the gas stream is conducted into the interior space of the motor housing through a line.

It is also possible for the gas stream to be impelled by a pump. To this end, the impeller may comprise a pump, in particular a membrane pump, in addition or as an alternative to the reservoir. The pump can be used to draw in gas from the reservoir and/or air from the surroundings and to conduct it into the interior space of the motor housing under excess pressure.

For the transport of the gas stream into the interior space of the motor housing, a line extending inside the motor housing between an inlet opening and the outlet opening may be provided. The pump may be arranged in the line between the inlet opening and the outlet opening in order to impel the gas stream through the line toward the outlet opening. The inlet opening may be connected to the reservoir or lead freely into the surroundings.

It may be advantageous for an intake opening, through which air is drawn in from the surroundings, to be spaced apart from the impeller housing. For example, if there is a risk of the impeller being immersed in water temporarily during use, the inlet opening can be arranged in a position from which air can still be drawn in in spite of the immersed impeller. The distance between the intake opening and the impeller housing may be at least twice, preferably at least five times, more preferably at least ten times the diameter of the impeller rotor. The intake opening may have a position which is arranged above the impeller relative to the direction of gravity.

The impeller may comprise a stator which retains the motor housing relative to the impeller housing. A line through which the gas stream for generating the excess pressure is fed from outside the impeller housing may extend inside the stator.

The excess pressure in the motor housing depends on the environmental conditions prevailing at the sealing gap. The excess pressure may for example be 0.5 mbar to 20 mbar, preferably one mbar to 12 mbar higher than atmospheric pressure if atmospheric pressure prevails at the sealing gap. The excess pressure may for example be 20 mbar to 500 mbar, preferably 50 mbar to 100 mbar higher than atmospheric pressure if the sealing gap is 0.5 m immersed in water.

The impeller may be driven such that the excess pressure prevails in the motor housing when the impeller is also in operation, that is to say the impeller rotor of the impeller is rotating. Such a mode of operation may be expedient, for example, in order to prevent dust dispersed by the impeller from being able to enter the interior space of the motor housing. In this mode of operation, when the impeller is switched off, the excess pressure in the interior space of the motor housing can also be discharged. Discharging the excess pressure means that the pump is switched off and/or the connection to a reservoir which is under excess pressure is interrupted, with the result that the excess pressure is reduced.

It is also possible to control the excess pressure in the motor housing irrespective of the operation of the impeller rotor. There can be a state in which the impeller rotor is operating while no excess pressure is prevailing in the interior space of the motor housing. There can be a state in which the impeller rotor is not operating while an excess pressure is prevailing in the interior space of the housing.

The application of the excess pressure in the interior space of the motor housing may be controlled depending on the environmental conditions. A sensor, which reacts to environmental conditions and actuates the application of the excess pressure, may be provided. For example, the sensor may react to water, so that the excess pressure is automatically applied when the impeller is immersed in water.

In addition or as an alternative to this, the application of the excess pressure in the interior space can be controlled on the basis of parameters inside the motor housing. If, for example, there is high air humidity inside the motor housing, the excess pressure can be applied in order to dry the interior space of the motor housing.

The impeller may comprise a control unit which controls the application of the excess pressure. The excess pressure can be applied on the basis of sensor data and/or according to defined programs. For example, the control unit could prescribe that the excess pressure is maintained for a prescribed period of time after the impeller rotor is deactivated, in order to prevent a negative pressure that draws in moisture being produced in the motor housing as a result of cooling the motor.

The invention moreover relates to an impeller comprising an impeller housing and a motor housing arranged in the impeller housing. A motor is arranged in an interior space of the motor housing, wherein an impeller rotor is driven by the motor in order to generate an air stream along an annular space formed between the impeller housing and the motor housing. An excess pressure prevails in the interior space of the motor housing, with the result that a leakage flow directed from the interior space of the motor housing outward is generated through a sealing gap arranged between the motor shaft and the motor housing.

The impeller may be further developed with other features which are described in conjunction with the method according to the invention. The method may be further developed with other features which are described in conjunction with the impeller according to the invention.

BRIEF DESCRIPTION OF THE DRAWINGS

The invention will be described by way of example below on the basis of advantageous embodiments with reference to the appended drawings, in which.

DETAILED DESCRIPTION

Figure 2:
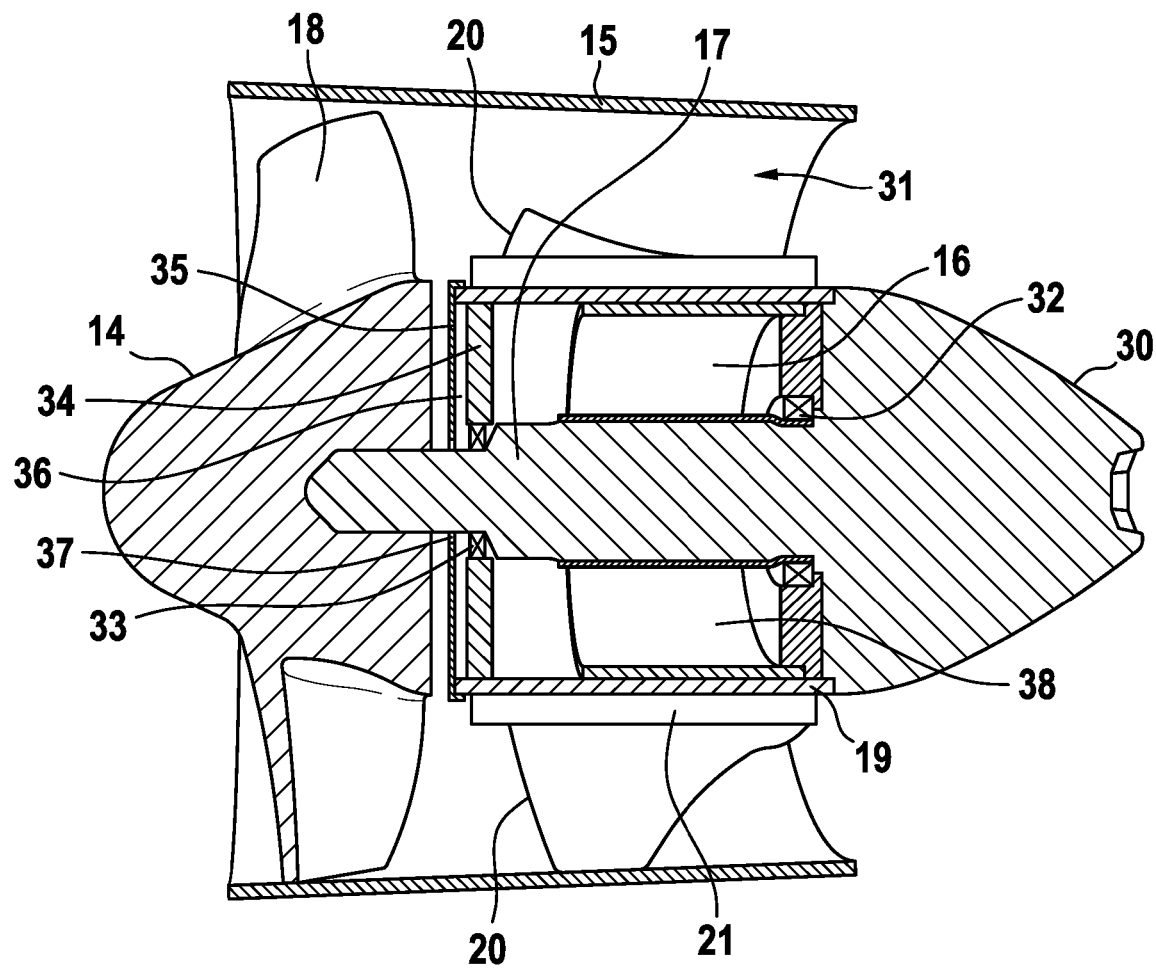
FIG. 2: shows a schematic sectional illustration of the impeller from FIG. 1.

An impeller according to the invention comprises, as per FIG. 2, an impeller rotor 14 which is arranged in an impeller housing 15. An electric motor 16 drives a motor shaft 17, with the result that the impeller rotor 14 connected to the motor shaft 17 is set in rotation. The motor 16 is retained in a motor housing 19 which is arranged in the interior space of the impeller housing 15.

A plurality of stators 20, which hold the motor housing 19 in position relative to the impeller housing 15, is formed in an annular space 31 formed radially on the outside of the motor housing 19 and radially on the inside of the impeller housing 15. The impeller rotor 14 comprises a plurality of rotor blades 18, which run around the periphery at the upstream end of the annular space 31. The rotation of the impeller rotor 14 generates an air stream which extends from the impeller rotor 14 through the annular space 31 to the opposite, downstream end of the impeller. The upstream end is the front end of the impeller and the downstream end is the rear end 30 of the impeller.

The front end of the impeller housing 15 is further upstream than the front end of the motor housing 19. The impeller housing 15 surrounds the impeller rotor 14 arranged upstream of the motor housing 19, with the result that the impeller rotor rotates in the interior space of the impeller housing 15. The rear end of the motor housing 19 is further downstream than the rear end of the impeller housing 15. In this way, the motor housing 19 comprises a rear portion which projects rearward beyond the impeller housing 15.

Cooling ribs 21, which extend in the longitudinal direction between the front end and the rear end of the motor housing, are formed on the outer side of the motor housing 19. In FIG. 2, the cooling ribs 21 are indicated only schematically. The air stream in the annular space 31 sweeps over the surface of the cooling ribs 21 and dissipates heat from cooling ribs 21. The heat dissipated from the motor during operation of the impeller propagates through the motor housing 19 to the cooling ribs 21 and is taken up by the air stream there.

The motor shaft 17 is mounted with respect to the motor housing 19 by way of a first bearing 32 and a second bearing 33, wherein the second bearing 33 is referred to as main bearing 33. The main bearing 33 is held in a bearing receptacle 34 of the motor housing 19. A front cavity 36 is formed between the main bearing 33 and a front wall 35 of the motor housing 19. That portion of the motor housing 19 that is formed between the first bearing 32 and the main bearing 33 is referred to as main space 38 of the motor housing 19. The front wall 35 of the motor housing 19 is guided up close to the motor shaft 17, with the result that a sealing gap 37 is formed between the motor housing 19 and the motor shaft 17.

If an excess pressure prevails in the interior space of the motor housing 19, a gas stream is generated which is guided outward through the sealing gap 37 and prevents impurities from entering.

Figure 1:
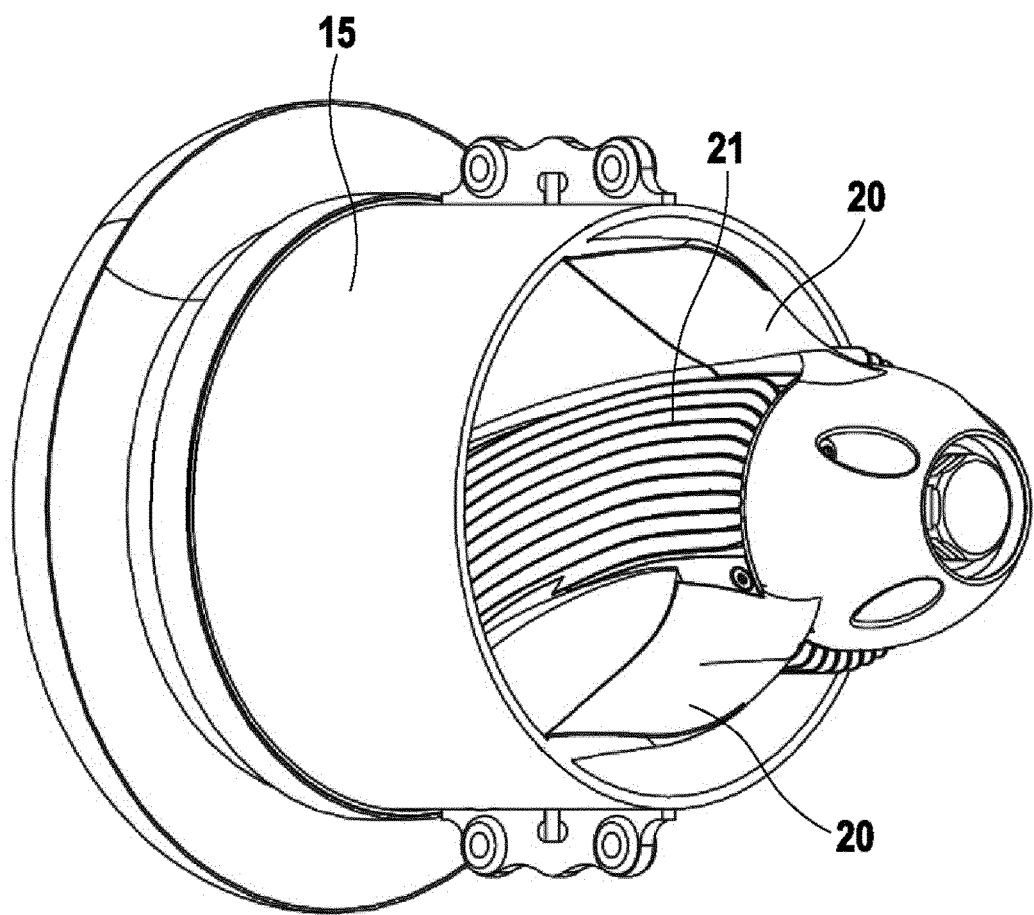
FIG. 1: shows an impeller according to the invention.
Figure 3:
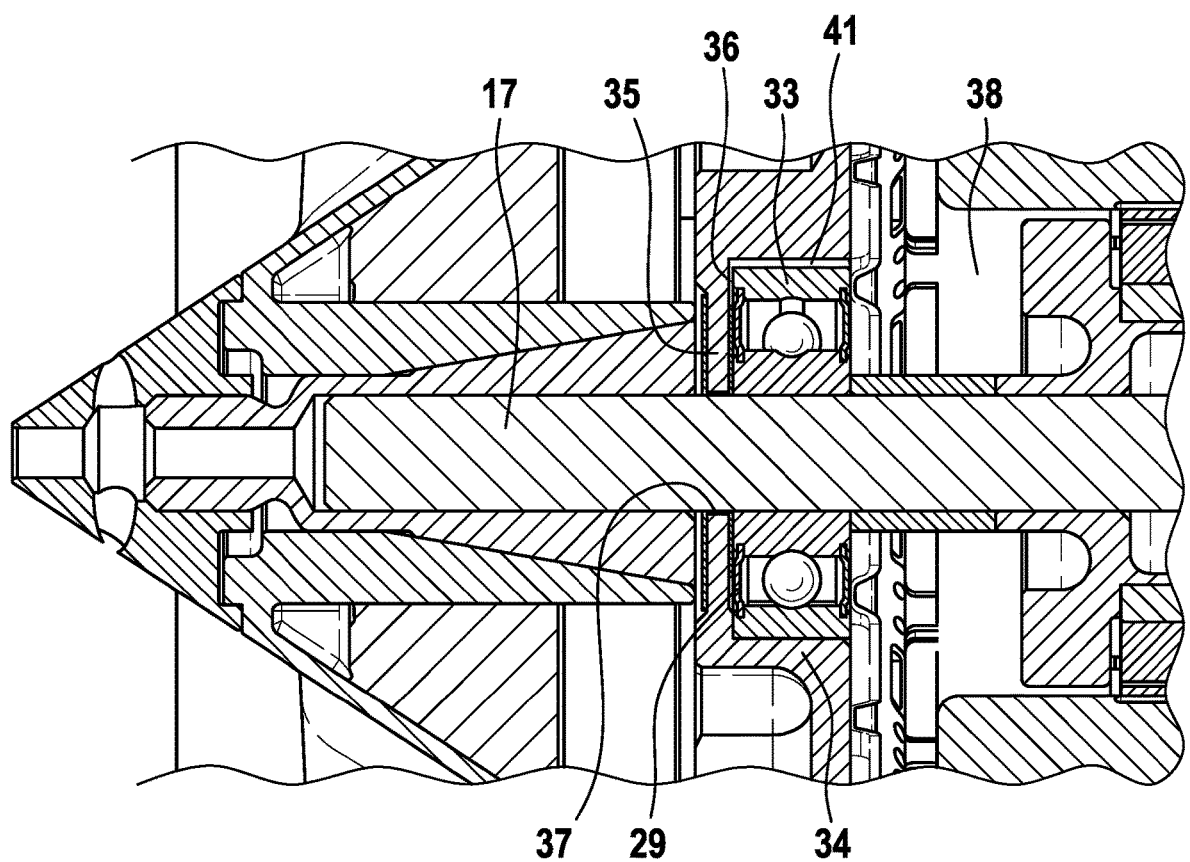
FIG. 3: shows a detail of the impeller from FIG. 1 in an enlarged illustration.

FIG. 3 shows the region of the main bearing 33 of the impeller from FIG. 1 in an enlarged sectional illustration. An opening 39, through which the motor shaft 17 is guided, is formed in the motor housing. The circumference of the opening 39 corresponds to the circumference of the sealing gap 37.

Figure 4:
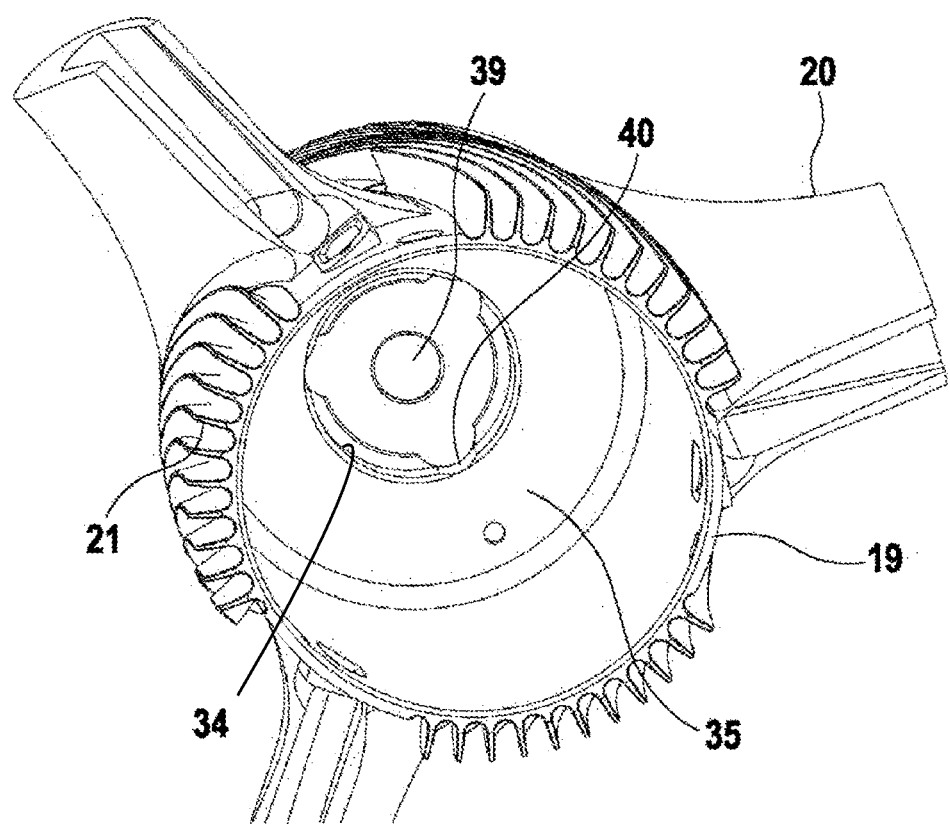
FIG. 4: shows a component of the impeller from FIG. 1 in an enlarged illustration.

The main bearing 33 is retained in a bearing receptacle 34 which is arranged in the front wall 35 of the motor housing 19 as per FIG. 4. The bearing receptacle 34 has three recesses 40 distributed over the periphery, with the result that a free space remains inside the recesses 40 between the motor housing and the circular circumference of the main bearing 33. The free space provides a compensation channel 41 between the main space 38 and the front cavity 36 of the motor housing 19. An excess pressure prevailing in the main space 38 propagates through the compensation channel 41 to the front cavity 36, so that a continuous air stream is impelled outward through the sealing gap 37. The main bearing is provided with a cover 29, with the result that the air stream does not pass through the main bearing 33.

Figure 6:
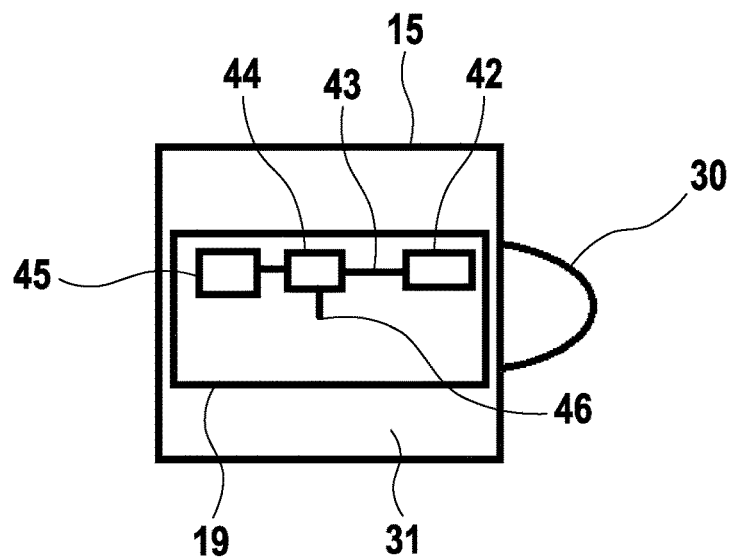
FIG. 6: shows a schematic illustration of an impeller according to the invention.

In the embodiment according to FIG. 6, a gas cartridge 42, which is under excess pressure and is connected to a valve 44 via a line 43, is arranged in the interior space of the motor housing 19. When the valve 44 is in the open state, the gas exits the gas cartridge 42 through an outlet opening 46 of the line 43 and generates the excess pressure in the interior space of the motor housing 19. A control unit 45 actuates the valve 44 such that the valve 44 is open or closed depending on the operating state of the impeller.

Figure 7:
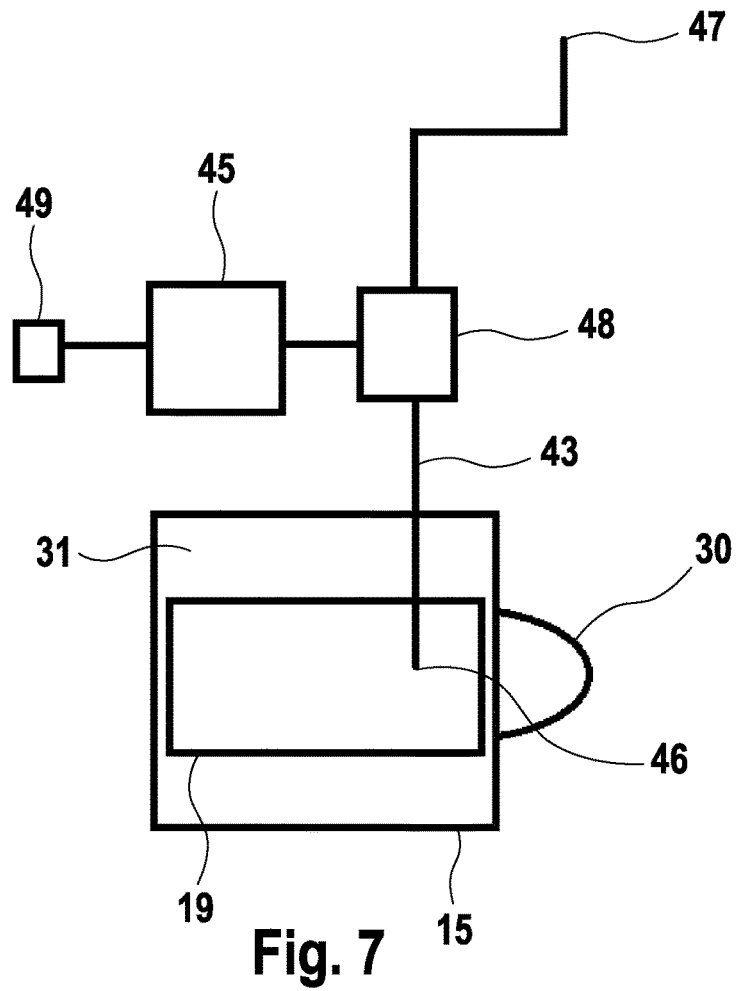
FIG. 7: shows the view according to FIG. 6 in the case of an alternative embodiment of an impeller according to the invention.

In FIG. 7, the line 43 for feeding the gas stream outward through the annular space 31 is guided to an intake opening 47, which leads freely into the surroundings. A membrane pump 48 is used to draw in air at the intake opening 47 and convey it through the line 43 to the outlet opening 46, in order to generate an excess pressure in the interior space of the motor housing 19. The control unit 44 actuates the membrane pump 48 on the basis of a sensor 49, which supplies measurement values about environmental conditions.

Figure 5:
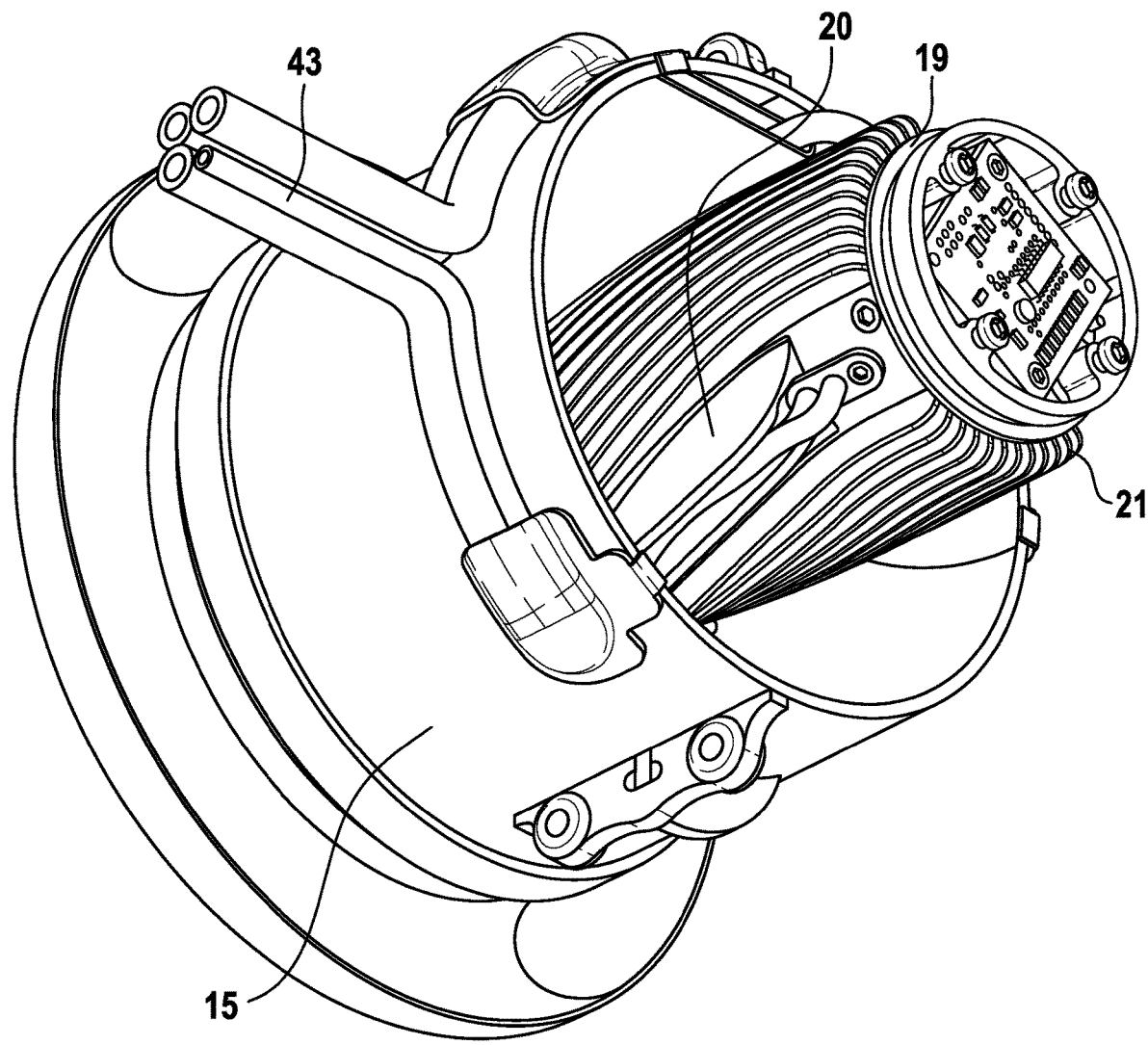
FIG. 5: shows an alternative embodiment of an impeller according to the invention.

According to FIG. 5, the line 43 is guided through the interior space of a stator 20 in the region of the annular space 31. The line 43 can in this way pass through the annular space 31 without adversely affecting the air stream generated by the impeller rotor 14.

The invention claimed is:

1. A method for operating an impeller assembly, the impeller assembly comprising:
    an impeller housing (15);
    a motor housing (19) arranged in the impeller housing, said motor housing (19) including a main space (38), a front cavity (36), and a bearing receptacle (34), said bearing receptacle including a recess (40);
    a motor (16) arranged in an interior space (36, 38) of the motor housing (19), the motor including a motor shaft (17);
    an impeller rotor (14) coupled to the motor shaft (17); and
    a main bearing (33) in the bearing receptacle (34) arranged between the motor (16) and the impeller rotor (14), a sealing gap (37) defined between the motor housing (19) and the motor shaft (17) between the main bearing (33) and the impeller rotor (14), wherein the front cavity (36) is arranged between the main bearing (33) and the impeller rotor (14), a compensation channel (41) bypassing the main bearing (33) is defined between the front cavity (36) and the main space (38), a portion of the compensation channel (41) is formed between the recess (40) and the main bearing (33), the motor (16) drives the impeller rotor (14) to generate an air stream along an annular space (31) formed between the impeller housing (15) and the motor housing (19), said method comprising:

applying a positive pressure in the interior space (36, 38) of the motor housing (19), to generate a leakage flow directed from the interior space (36, 38) of the motor housing (19) outward through the sealing gap (37).

2. The method of claim 1, wherein a maximum distance between the motor shaft (17) and the motor housing (19) across the sealing gap (37) is less than 100 μm.

3. The method of claim 1, wherein the main bearing (33) has a cover (29), resulting in increased flow resistance increased through the main bearing (33).

4. The method of claim 1, wherein an outlet opening (46), from which a gaseous medium exits to generate the positive pressure, is formed in the interior space (36, 38) of the motor housing (19).

5. The method of claim 1, wherein the impeller assembly comprises a reservoir (42) of a gaseous medium, from which a gas stream is supplied to generate the positive pressure.

6. The method of claim 1, wherein a gas stream for generating the positive pressure is impelled by a pump (48).

7. The method of claim 6, wherein, to generate the gas stream, air is drawn in from the surroundings through an intake opening (47), and in that a distance between the intake opening (47) and the impeller housing (15) is at least twice the diameter of the impeller rotor (14).

8. The method of claim 1, wherein the impeller assembly comprises a stator (20) which retains the motor housing (19) relative to the impeller housing (15), and in that a line (43) through which a gas stream for generating the positive pressure is fed from outside the impeller housing (15) extends inside the stator (20).

9. An impeller assembly comprising:
an impeller housing (15);
a motor housing (19) arranged in the impeller housing, said motor housing (19) including a main space (38), a front cavity (36), and a bearing receptacle (34) said bearing receptacle including a recess (40);
a motor (16) arranged in an interior space (36, 38) of the motor housing (19), the motor including a motor shaft (17);
an impeller rotor (14) driven by the motor (16) to generate an air stream along an annular space (31) formed between the impeller housing (15) and the motor housing (19); and
a main bearing (33) arranged in the bearing receptacle (34) between the motor (16) and the impeller rotor (14),
wherein the front cavity (36) is arranged between the main bearing (33) and the impeller rotor (14), a compensation channel (41) bypassing the main bearing (33) is defined between the front cavity (36) and the main space (38), a portion of the compensation channel (41) is formed between the recess (40) and the main bearing (33), a positive pressure prevails in the interior space (36, 38) of the motor housing (19) which generates a leakage flow directed from the interior space (36, 38) of the motor housing (19) outward through a sealing gap (37) arranged between the motor shaft (17) and the motor housing (19).

10. The impeller assembly of claim 9, comprising:
an outlet opening (46) in the interior space (36, 38) of the motor housing (19) from which a gas stream flows to generate the positive pressure.

11. The impeller assembly of claim 10, wherein the gas stream is impelled by a pump (48) or the impeller assembly comprises a reservoir (42) of a gaseous medium, from which the gas stream is supplied.

12. The impeller assembly of claim 11, comprising:
a stator (20) which retains the motor housing (19) relative to the impeller housing (15), and
a line (43) through which the gas stream is fed from outside the impeller housing (15) to the outlet opening (46) extends inside the stator (20).

* * * * *